US011599658B2

(12) United States Patent
Chin et al.

(10) Patent No.: US 11,599,658 B2
(45) Date of Patent: Mar. 7, 2023

(54) COMPLIANCE WITH DATA POLICIES IN VIEW OF A POSSIBLE MIGRATION

(71) Applicant: salesforce.com, inc., San Francisco, CA (US)

(72) Inventors: Tiffany Joy Chin, San Mateo, CA (US); Chad Richard Holdorf, San Rafael, CA (US); Anubha Dubey, Sunnyvale, CA (US); Matthew Wilbert Parin, New Richmond, WI (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/163,296

(22) Filed: Jan. 29, 2021

(65) Prior Publication Data

US 2022/0171869 A1    Jun. 2, 2022

Related U.S. Application Data

(60) Provisional application No. 63/120,721, filed on Dec. 2, 2020, provisional application No. 63/120,201, filed on Dec. 1, 2020.

(51) Int. Cl.
*G06F 21/62* (2013.01)
*G06Q 30/00* (2012.01)
(Continued)

(52) U.S. Cl.
CPC ........ *G06F 21/6218* (2013.01); *G06F 16/214* (2019.01); *G06F 21/6245* (2013.01);
(Continued)

(58) Field of Classification Search
CPC ............. G06F 21/6218; G06F 21/6245; G06F 16/214; G06F 3/018; H04L 67/10;
(Continued)

(56) References Cited

U.S. PATENT DOCUMENTS 10,067,840 B1    9/2018   Labaj et al.
10,324,773 B2    6/2019   Wing et al.
(Continued)

FOREIGN PATENT DOCUMENTS

CA          2798990 A1    6/2014
WO    WO-2018017057 A1 *  1/2018    ........... G06F 9/5072

OTHER PUBLICATIONS

"Business and Professions Code, Section 22575," 1 page, State of California, downloaded from https://leginfo.legislature.ca.gov/faces/codes_displaySection.xhtml?lawCode=BPC§ionNum=22575 on Dec. 2, 2020.

(Continued)

*Primary Examiner* — Ruolei Zong
(74) *Attorney, Agent, or Firm* — Nicholson De Vos Webster & Elliott LLP

(57) ABSTRACT

According to some implementations, a data policy compliance service causes the display of a dashboard, wherein the dashboard identifies a first geographic region in which there is a datacenter hosting an organization instance of a customer of a cloud-based software provider. Responsive to user interaction, the data policy compliance service causes the display of the dashboard to reflect information regarding a possible migration of the organization instance from the first geographic region to a second geographic region of the plurality of geographic regions. The information includes a set of one or more compliance assessment metrics reflecting a level of compliance of the organization instance with data privacy and/or data security laws, regulations, and/or policy.

27 Claims, 11 Drawing Sheets

(51) Int. Cl.
*H04L 29/08* (2006.01)
*H04L 67/10* (2022.01)
*G06Q 30/018* (2023.01)
*G06F 16/21* (2019.01)
*G06Q 10/0639* (2023.01)
*G06F 3/0482* (2013.01)

(52) U.S. Cl.
CPC ..... *G06Q 10/06393* (2013.01); *G06Q 30/018* (2013.01); *H04L 67/10* (2013.01); *G06F 3/0482* (2013.01)

(58) Field of Classification Search
CPC ......... G06Q 10/0639; G06Q 10/06393; G06Q 10/063; G06Q 30/018
USPC ............................................................ 726/1
See application file for complete search history.

(56) References Cited

U.S. PATENT DOCUMENTS

| | | | |
|---|---|---|---|
| 10,706,970 | B1 | 7/2020 | Florissi et al. |
| 10,756,991 | B2 | 8/2020 | Layman et al. |
| 10,878,379 | B2 | 12/2020 | Wing et al. |
| 2017/0132222 | A1* | 5/2017 | Li ........................... G06F 16/94 |
| 2017/0193239 | A1* | 7/2017 | Chari .................... G06F 21/577 |
| 2018/0018602 | A1 | 1/2018 | Dimaggio et al. |
| 2018/0255099 | A1* | 9/2018 | Chen ................... H04L 63/1416 |
| 2018/0276414 | A1 | 9/2018 | Beckman et al. |
| 2018/0357226 | A1* | 12/2018 | Su ........................ G06F 16/9535 |
| 2019/0235895 | A1* | 8/2019 | Ovesea ................. G06F 9/4856 |
| 2019/0235918 | A1* | 8/2019 | Liu ......................... G06F 3/0617 |
| 2019/0236150 | A1* | 8/2019 | Zaslavsky ........... G06F 16/2308 |
| 2020/0050769 | A1 | 2/2020 | Bhosale et al. |
| 2020/0311699 | A1 | 10/2020 | Ranjit et al. |
| 2020/0351077 | A1 | 11/2020 | Krishnaswamy et al. |
| 2022/0108031 | A1 | 4/2022 | Saini et al. |

OTHER PUBLICATIONS

"Data Privacy—Amazon Web Services (AWS)," 6 pages, downloaded from https://aws.amazon.com/compliance/data-privacy-faq/ on Dec. 2, 2020.
"HHS.gov, Health Information Privacy, The HIPAA Privacy Rule," 3 pages, U.S. Department of Health & Human Services, downloaded from https://www.hhs.gov/hipaa/for-professionals/privacy/index.html on Dec. 2, 2020.
"Shared Responsibility Model—Amazon Web Services (AWS)," 5 pages, downloaded from https://aws.amazon.com/compliance/shared-responsibility-model/ on Dec. 2, 2020.
"Prioritizing Data Security Compliance Throughout a Cloud Migration," May 19, 2021, 5 pages, Copado, downloaded from https://www.copado.com/devops-hub/blog/prioritizing-data-security-compliance-throughout-a-cloud-migration.
Non-Final Office Action, U.S. Appl. No. 17/163,307, dated Sep. 16, 2022, 17 pages.

* cited by examiner

FIG. 1E

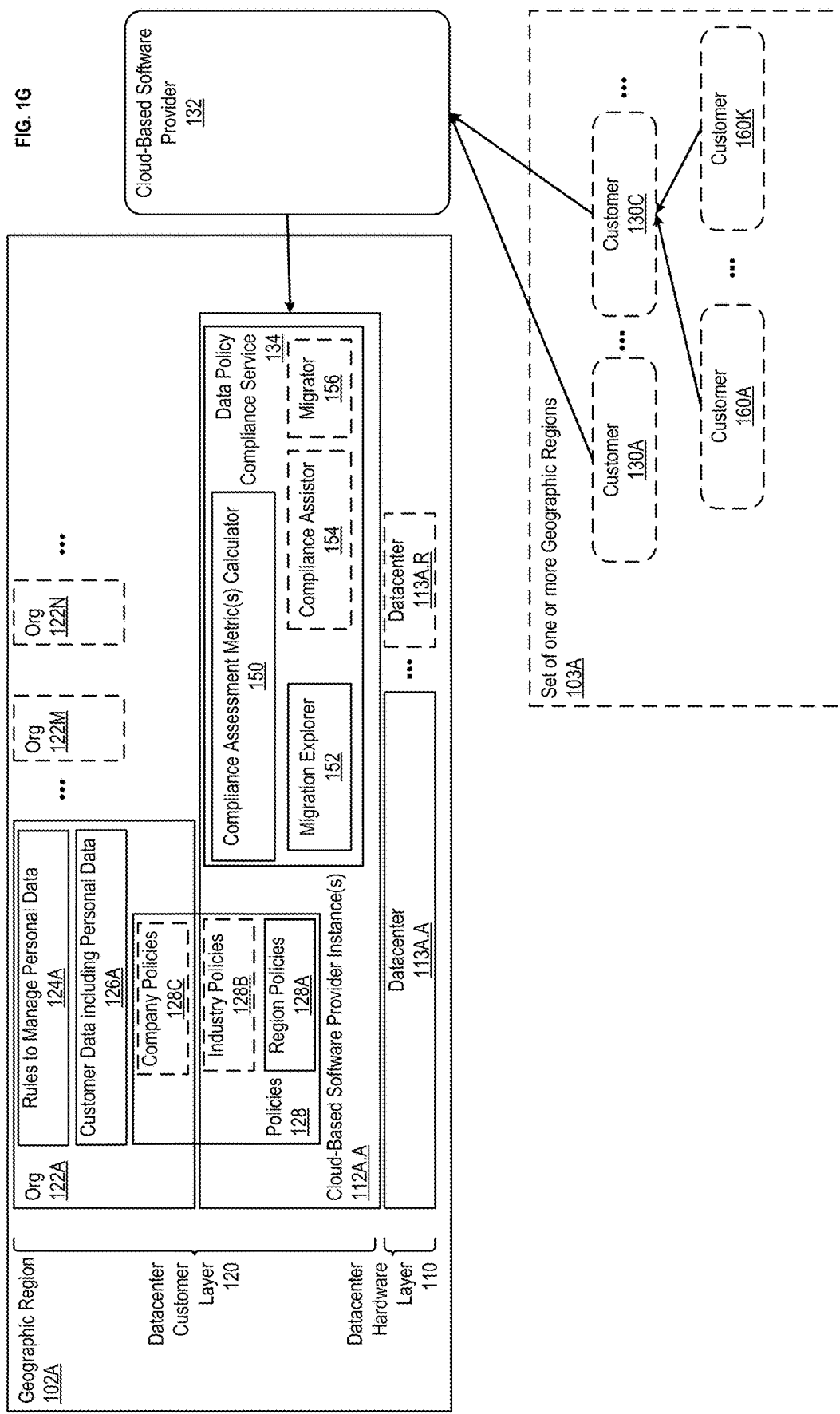

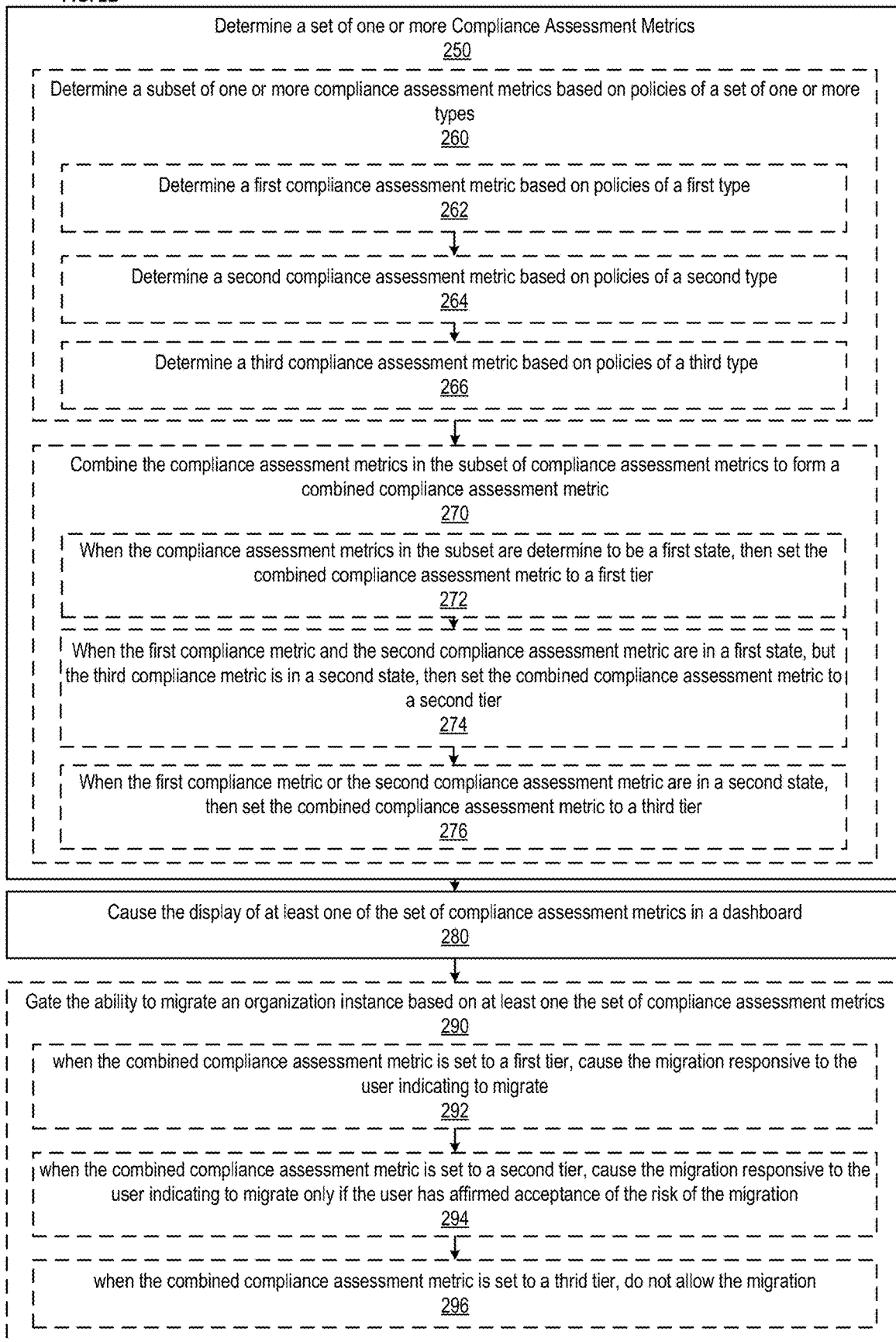

US 11,599,658 B2

COMPLIANCE WITH DATA POLICIES IN VIEW OF A POSSIBLE MIGRATION

CROSS-REFERENCE TO RELATED APPLICATIONS

This application claims the benefit of U.S. Provisional Application No. 63/120,721, filed Dec. 2, 2020, and U.S. Provisional Application No. 63/120,201, filed Dec. 1, 2020, which are hereby incorporated by reference.

TECHNICAL FIELD

One or more implementations relate to the field of data privacy and/or data security; and more specifically, to compliance with data privacy and/or data security policies.

BACKGROUND ART

Companies collect, share, analyze, and store their business data, and must do so in compliance with complex regional and industry-specific regulations. Companies must vigilantly monitor data privacy and/or data security enforcement trends, laws, and regulations to mitigate risks and potential liability. For instance, sensitive data is information that requires protection against unwarranted disclosure. Protection of sensitive data may be required for legal or ethical reasons, for issues pertaining to personal privacy, and/or for proprietary considerations. Broadly speaking, the term "personal data" is any information relating to an identified or identifiable person. Personal data can include a person's name, a person's contact information (e.g., a mailing address, email address, and/or telephone number), a person's user identifier (referred herein as UserID) assigned by an application/service, an IP address associated with a device used by the person to access the application/service, or any other information that is related to the person which can be obtained or used by an application/service. In some cases, a distinction can be made between personal data, which uniquely identifies a user (e.g., a person's name) or renders the user identifiable (e.g., a user identifier), and user traceable data. User traceable data is data that is not directly personal data (i.e., does not directly identify the user or make the user identifiable) but can be traced back to the identity or an activity of the user (e.g., an IP address of a device used by the user, a user's mailing address if the user is not the only person living at that address, etc.).

Cloud services are hosted and perform their processing in datacenter(s). These datacenter(s) may be: 1) first party datacenter(s), which are datacenter(s) owned and/or operated by the same entity that provides and/or operates some or all of the software that provides the service(s); and/or 2) third-party datacenter(s), which are datacenter(s) owned and/or operated by one or more different entities than the entity that provides the service(s) (e.g., the different entities may host some or all of the software provided and/or operated by the entity that provides the service(s)). For example, third-party datacenters may be owned and/or operated by entities providing public cloud services (e.g., Amazon.com, Inc. (Amazon Web Services), Google LLC (Google Cloud Platform), Microsoft Corporation (Azure), Alibaba Group (Alibaba Cloud)). Operators of third-party datacenters provide infrastructure-as-a-Service (IAAS or IaaS) (e.g., virtual machines, servers, and/or storage).

The "hardware layer" of public cloud services includes the hardware (e.g., to provide compute, storage) and software to provide third party datacenter services for different regions, zones, and/or edge locations. The third-party datacenter provider is responsible for the security (sometime referred to as security of the cloud) of this hardware layer. The "customer data layer" is a layer above the hardware layer and represents what the third-party datacenter provider's customers are responsible for in terms of security (sometime referred to as security in the cloud). This customer data layer includes the customer data, as well as one or more of: 1) platform, applications, identity, and access management; 2) operating system, network, and firewall configurations; 3) client-side data encryption and data integrity authentication; 4) server-side encryption (file system and/or data); and 5) networking traffic protection (encryption, integrity, and identity).

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1E is part of a dashboard of a data policy compliance service of a cloud-based software provider according to some implementations.

FIG. 1G is a block diagram illustrating components according to some implementations.

FIG. 2B is a flow diagram for generating compliance assessment metrics According to Some Implementations.

DETAILED DESCRIPTION

Figure 1A:
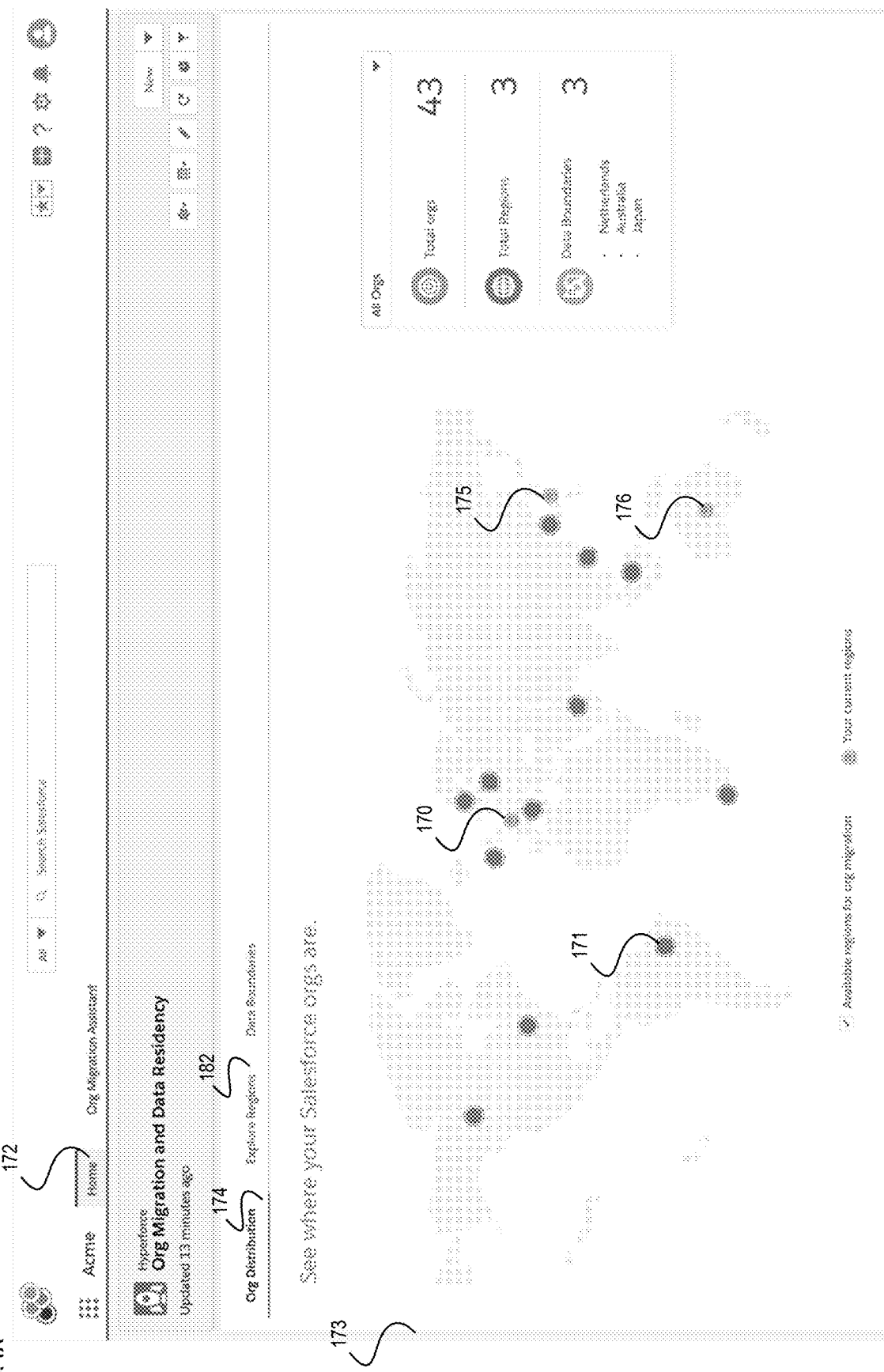
FIG. 1A is the top part of a dashboard of a data policy compliance service of a cloud-based software provider according to some implementations.

The following description describes implementations for a framework to allow customers of a cloud-based software provider to discover the applicable data polices and set up their organization instance(s) in compliance those policies (e.g., regional and/or industry-specific data privacy and/or data security enforcement trends, laws, and regulations). Some implementations help companies monitor their organization instance compliance in their current region. Some implementations help companies migrate their organization instance(s) to other regions safely and securely. An organization instance is information (e.g., data, metadata, configuration, applications, code, etc.) hosted within a cloud-based software provider service. As such, a company may have one or more organization instances with a given cloud-based software provider. A cloud-based software provider's service can enable a customer to collect, process, and store user data as part of one or more of that customer's organization instances.

Typically, datacenters are available in different geographic regions. For instance, a third-party datacenter operator often has datacenters in different geographic regions and allows each of its customers to select a set of one or more of these geographic regions to host its data and/or processing. Third-party datacenter operators also often offer tools that a customer of the datacenter can select from in order to comply with data privacy and/or data security policies in the region which each datacenter is located. As such, a customer of a third-party datacenter must understand how its data is categorized relative to data privacy and/or security, and then select the right third-party datacenter tool(s) for that data to comply with that customers view on data privacy and/or data security.

A cloud-based software provider providing cloud services (e.g., Software-as-a-Service (SaaS); Data-as-a-Service (DAAS or DaaS); Platform-as-a-service (PAAS or PaaS); etc.) to its customers may use first party datacenters and/or third-party datacenters. For instance, a third-party datacenter operator may have a cloud-based software provider as a customer, and the cloud-based software provider may have one or more customers (and in fact, the each of the cloud servicers provider's customers may have a service and/or product they provide to customers of their own). Regardless, a cloud-based software provider using datacenters (be they first-party and/or third-party) in different regions means that as a result the cloud-based software provider's customers are having their data hosted and processed in one or more those different regions. For instance, when a cloud-based software provider is using one or more third party datacenters, then as a result the customers of the cloud-based software provider are using the one or more third party datacenters.

In some implementations, a cloud-based software provider provides a service that allows the cloud-based software provider's customers to choose the geographic region(s) in which their data will be hosted and/or processed. Thus, a customer of the cloud-based software provider may choose a set of one or more of the geographic region(s) having an available datacenter(s) (first-party and/or third-party relative to the cloud-based software provider) to host that customer's data residing in the cloud-based software provider's service. Put another way, the cloud-based software provider provides a service (which may be referred to as a data policy compliance service, a data compliance service, a geographic region service, a selection service, etc.) to its customers that allows those customers to choose the geographic regions in which the available datacenter(s) hosting and processing their data are located. Furthermore, some implementations include, as part of this data policy compliance service, one or more compliance assessment metrics reflecting the level of compliance with data privacy and/or data security policies in the geographic regions of the available datacenters. These compliance assessment metric(s) allow the cloud-based software provider's customers to be prepared and understand their organization health for any region they are currently in (referred to as the current region, hosted region(s), host region(s), organization region(s)) and/or interested in moving into (referred to as the target region(s)).

In addition to geographic regions, data privacy and/or data security laws, regulations, and/or policy can vary by industry (e.g., the insurance industry, the banking industry, the oil industry, etc.) and/or by company (e.g., one companies view of the laws/regulation may be different from another's, one companies risk assessment relative to compliance may be different than another's). In some implementations, the above compliance assessment metrics are based on: 1) the laws and/or regulations of the geographic region in which a datacenter is located (also referred to as geographic region policies, region-level policies, country-level policies); 2) the laws, regulations, and/or policy pertaining to an industry (also referred to industry policies, industry standards, industry data standards, industry specific regulations, industry-level policies); 3) a given company's policies (sometimes referred to as corporate policies, company-level policies, corporate-level policies); or 4) any combination thereof. Thus, the compliance assessment metrics allow the cloud-based software provider's customers to be prepared and understand their organization health for any region and industry they are currently in and/or interested in moving into. Thus, some implementations support 2 types of compliance assessment metrics: 1) a first type of which each is specific one type of policy (e.g., region, industry, company); and 2) a second type that represents a combination of two or more of the first types.

Thus, in the case of target region(s), the compliance assessment metric(s) provide a tool to: 1) guide a customer to a more compliant posture; and/or 2) a gating mechanism for migration from one region to another. Thus, it is a tool to help the cloud-based software provider's customers see how ready their products/services are for being hosted and/or processed in different regions (which can be an indicator of and/or the equivalent of seeing how ready a product and/or service is for being offered in different regions). This can help prioritize which region(s) a product and/or service should be rolled out. Additionally or alternatively, this may allow help the cloud-based software provider's customers determine the level of effort required to host data closer to their customers to improve performance.

Also, some implementations provide recommended actions to improve compliance with data privacy and/or data security in any current and/or new region. Thus, in the case of target region(s), these recommendations provide a tool to help the cloud-based software provider's customers get their products/services ready for being hosted and/or processed in a target region (which can be an indicator of and/or the equivalent of seeing how ready a product and/or service is for being offered a target region).

Implementations may also show: a) the region requirements (local laws, compliance, etc.); b) what kind of annualized contract value (ACV) potential there is in a region by opportunity; c) prioritized lists to make a product and/or service available in a particular region; d) initiate processes to get product and/or services teams to put their product and/or services into a region; or e) any combination thereof.

According to some implementations, the compliance assessment metrics are based on: 1) a hierarchy of types policies; and/or 2) the region(s) of different types of activities. In terms of a hierarchy of types policies, some implementations consider geographic regions policies, followed by industry policies, followed by a company's policies when generating the compliance assessment metrics. In terms of the region(s) of different types of activities, some implementations consider the geographic region in which: a) data is collected (also referred to as data collection); b) data is hosted (also referred to as data hosting); c) data is processed (also referred to as data processing); or d) any combination thereof.

Following are some examples of policies and types of activities. Example of geographic region data policies (also referred to as region-level policies) include New York's Stop Hacks and Improve Electronic Data Security (SHIELD) Act, California's California Consumer Privacy Act of 2018 (CCPA), and the European Union's General Data Protection Regulation (GDPR). The term "data sovereignty" or "data residency" is sometimes used to refer to requirements that records about a nation's citizens or residents follow its personal or financial data processing laws, while "data localization" goes a step further in requiring that initial collection, processing, and storage first occur within the national boundaries. In some cases, data about a nation's citizens or residents must also be deleted from foreign systems before being removed from systems in the data subject's nation. Thus, another example is where a region is a country, and data sovereignty/data residency and data localization requirements are examples of geographic region data policies (also referred to as a country-level data policies). In the US, the Health Insurance Portability and Accountability Act (HIPAA) may be considered an industry policy. As another example, assume a cloud-based software provider's customer (referred to as the first customer) is a company that provides a service (e.g., insurance quotes) in a first country, and the company's customers (referred to as second customers) are people in that first country which access the company's service and enter/create data (in other words, data is collected in the first country). Also, assume that the company has configured the cloud-based software provider's service to send the collected data to an engine in a second country that processes the data (i.e., data processing) to produce a result (e.g., an insurance quote). Finally, assume that the company has configured the cloud-based software provider's service to send the result back to a datacenter in the first country to be stored (i.e., data hosting). In this case, some implementations may generate the compliance metrics for this example by considering the applicable geographic region policies to be that of the region in which the data hosting is performed (i.e., the first country), the industry policy to be that of the insurance industry, and the company policies to be that of the company. Additionally or alternatively, some implementations may consider the region of the data collection and/or the data processing as part of the compliance metric determination. Additionally or alternatively, some implementations may consider whether the requisite consent for the end users (the second customers) has been obtained to host and/or process the data in any particular region (e.g., the first country, the second country, or another region).

Some implementations provide as the set of one or more compliance metrics: a) a metric for each of the types of policies; b) a metric representing the combination of policies.

As indicated above, a cloud-based software provider may be operated by a first entity and provide one or more services to its customers. A company can establish one or more organization instance(s) with the cloud-based software provider, where each organization instance can include a group of users who share a common access with specific privileges. As such, different organization instances may be different entities (e.g., different companies, different departments/divisions of a company, and/or other types of entities), and some or all of these entities may be vendors that sell or otherwise provide products and/or services to their customers. Each organization instance may allow for management, organization instance-specific functionality, configuration, customizations, non-functional properties, associated applications, etc. In the case of a company creating multiple organization instances, not only is the company a cloud-based software provider customer, but each group of users operating their organization instance is also a cloud-based software provider customer.

Compliance Assessment Metrics for Region(s) According to Some Implementations

FIG. 1A is the top part of a dashboard of a data policy compliance service of a cloud-based software provider according to some implementations. The dashboard is of a data policy compliance service, where the dashboard identifies a first geographic region 170 in which there is a datacenter hosting an organization instance of a customer of a cloud-based software provider. Also, in some implementations, the first geographic region 170 is one of a plurality of geographic regions and the dashboard also includes an indication of each of the plurality of geographic regions (e.g., second geographic region 171). In some implementations, the plurality of geographic regions includes the geographic regions in which there is a datacenter in which the cloud-based software provider may host organization instances. Additionally or alternatively, the dashboard includes a set of one or more compliance assessment metrics (see FIG. 1B) reflecting how compliant the organization instance is with a set of one or more policy types based on the organization instance being hosted in the first region.

More specifically, FIG. 1A includes a global menu bar along the top that shows the cloud-based software provider's customer is Acme and selection of the "Home" tab 172. Below this is a tile 173 with a menu bar with the "Org Distribution" tab 174 selected. Within this tile and below the tile's menu bar is a map including multiple geographic regions, a drop-down menu currently showing "All Orgs" is selected, and a legend. Since "All Orgs" is selected, the legend indicates that the customer has 43 "Total Orgs" in 3 "Total Regions." Thus, the legend indicates that the customer Acme has 43 organization instances with the cloud-based software provider, and each of these 43 organization instances are in one of 3 geographic regions. The 3 geographic regions are the current regions, and their locations are shown on the map with an icon in 3 different places (geographic regions 170, 175, 176). Thus, each of these regions represents a geographic region with one or more datacenters that are currently hosting an organization instance. Additionally or alternatively, a different icon may be shown on the map to indicate each region (e.g., geographic region 171) in which there is at least one datacenter (e.g., those to which the cloud-based software provider has the ability to host an organization instance). Thus, in some implementations these reflect "available regions for migration" of an existing organization instance and/or available regions for a new organization instance.

Figure 1B:
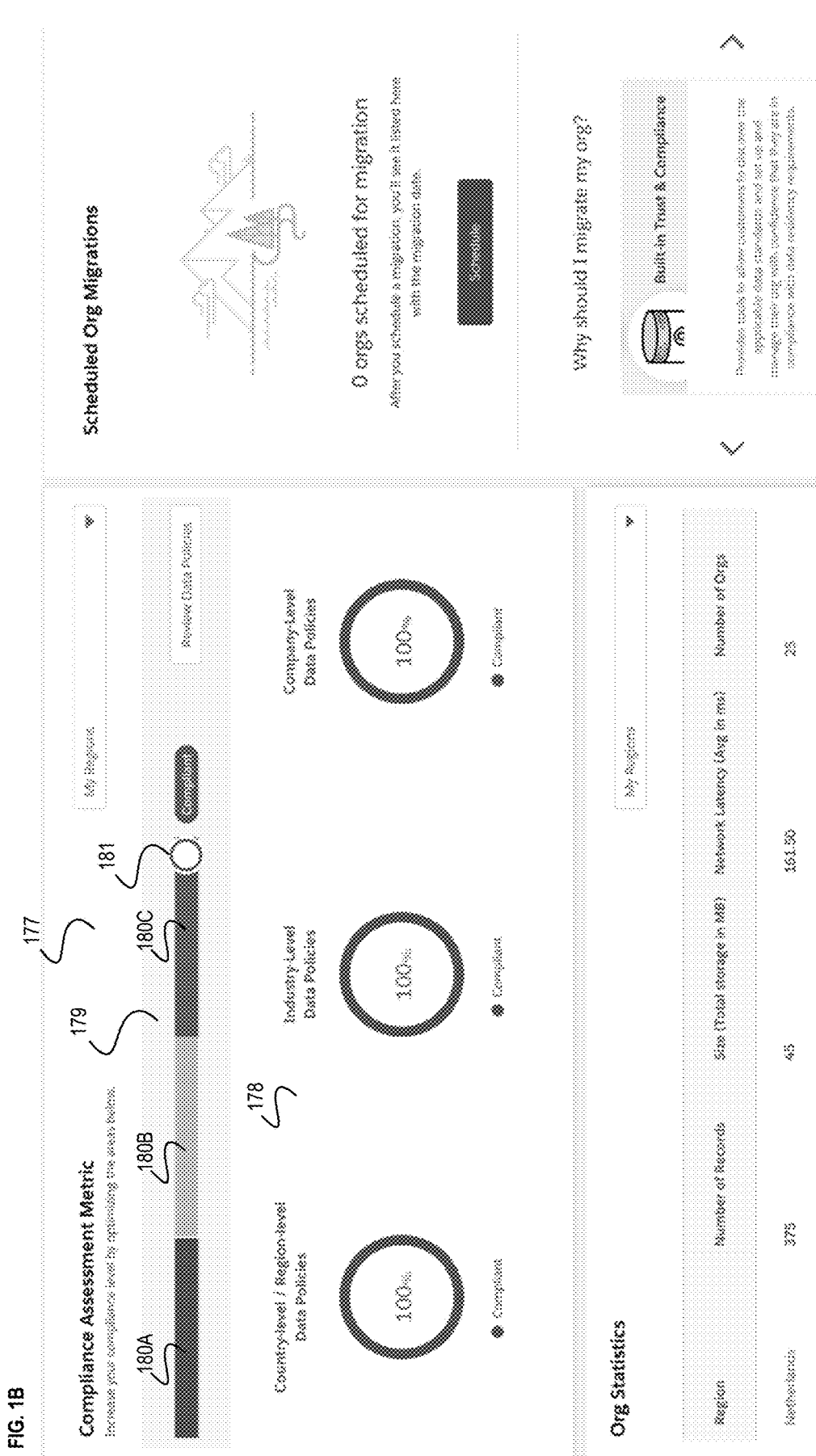
FIG. 1B is the bottom part of a dashboard of a data policy compliance service of a cloud-based software provider according to some implementations.

FIG. 1B is the bottom part of a dashboard of a data policy compliance service of a cloud-based software provider according to some implementations. This includes a second tile 177 titled "Compliance Assessment Metric." This tile shows 2 types of compliance assessment metrics: 1) a first type 178 for which there is a separate compliance assessment metric for each of the policy types; and 2) a second type 179 that represents a combination of two or more of the first types. In FIG. 1B, the policy types include country-level/region-level data policies, industry-level data policies, and company-level data policies, and each of these policy types has a separate compliance assessment metric. In the specific examples of FIG. 1B, each shows 100% compliance via a solid-colored ring, a 100%, and the word "Compliant." FIG. 1B also shows the second type 179 of compliance assessment metric which reflects a manner of combing all three of the first type 178. This second type 179 of compliance assessment metric has 3 tiers representing different levels of compliance (e.g., not compliant, proceed with caution, and ready to go). In the specific example of FIG. 1B, this is shown as a horizontal bar with 3 separate areas (180A, 180B, and 180C) for the 3 tiers, as well as a circle 181 in one of the 3 areas indicating how the customer is currently scoring. One or more of these compliance assessment metrics may change based on changes to any of the policies and/or changes to the rules the customer has enabled to govern personal data.

Responsive to this dashboard, a user may take a variety of actions, including: 1) consider migrating a given organization instance from a current region to a different region (also referred to as a target region); 2) consider trying to improve a compliance assessment metric (if the customer was not at 100% already); 3) consider what regions are available to host a new organization instance; etc. FIGS. 1C-F illustrate the flow according to this first action. More specifically, responsive to user input that selects the "Explore Regions" tab (182 in FIGS. 1A and 1C), the content of the dashboard is updated to include information regarding the plurality of geographic regions. In some implementations, this includes an indication of the tier to which the organization instance would belong if the organization instance was moved from the first geographic region to one or more other geographic regions in the plurality of geographic regions. Responsive to further user interaction (e.g., selection of one of the current geographic regions, such as 170, and one of the other geographic regions, such as 171), the dashboard is updated to reflect information regarding a possible migration of the organization instance from the first geographic region to a second geographic region of the plurality of geographic regions as reflected in FIG. 1C-D.

Figure 1C:
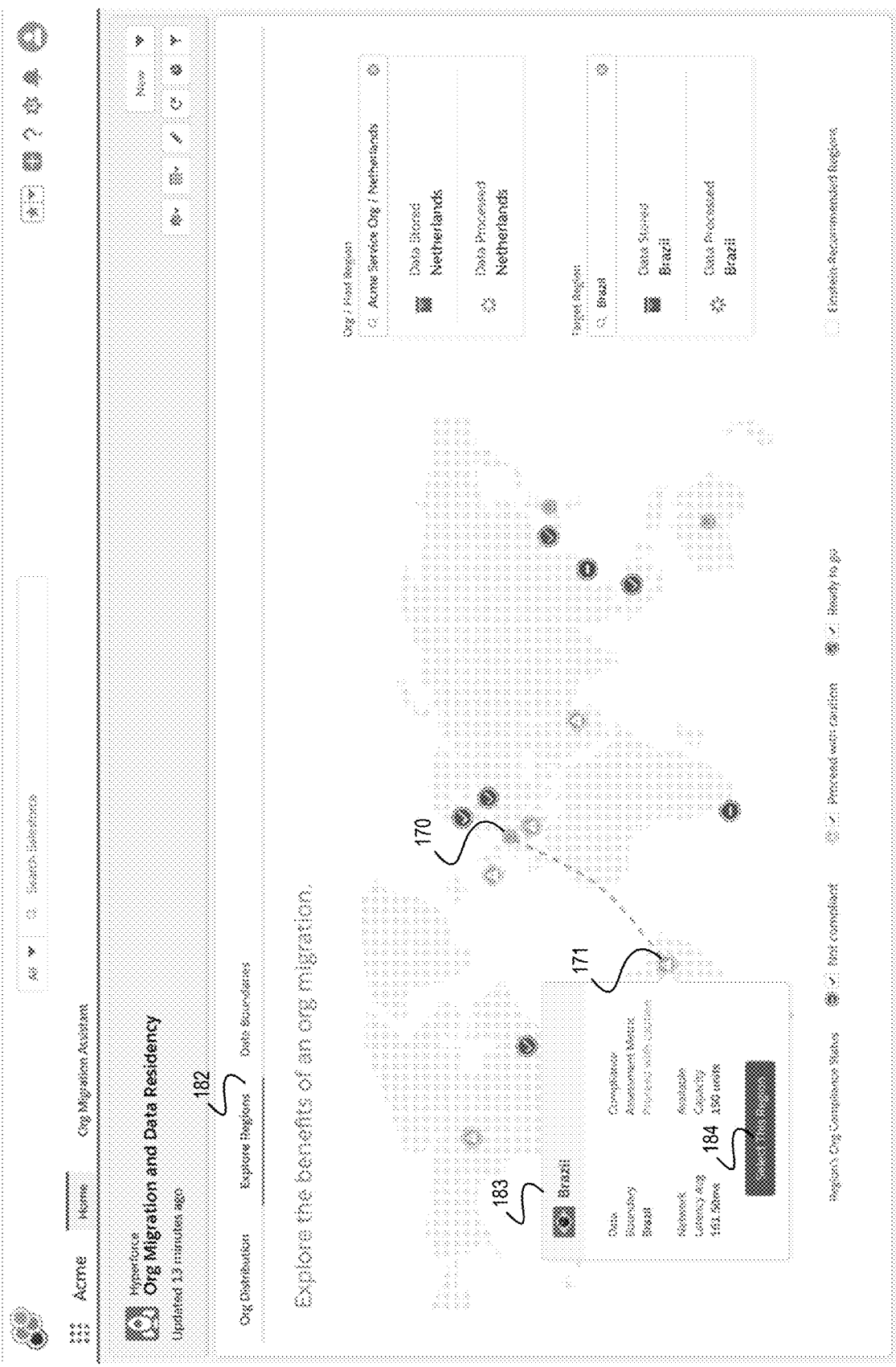
FIG. 1C is the top part of an updated dashboard of a data policy compliance service of a cloud-based software provider according to some implementations.

FIG. 1C is the top part of an updated dashboard of a data policy compliance service of a cloud-based software provider according to some implementations. FIG. 1C is similar to FIG. 1A, so the differences will be discussed. In FIG. 1C, the icons that reflect the "available regions for migration" are replaced with icons that reflect the tier (see above description regarding tiers) to which the organization instance would belong if the organization instance was moved from the first geographic region to one or more other geographic regions in the plurality of geographic regions. In addition, FIG. 1C is responsive to user input having selected a second region (Brazil) 171 and has a pop-up 183 including information regarding the region. In addition, the pop-up includes a "Select This Region" button 184.

Figure 1D:
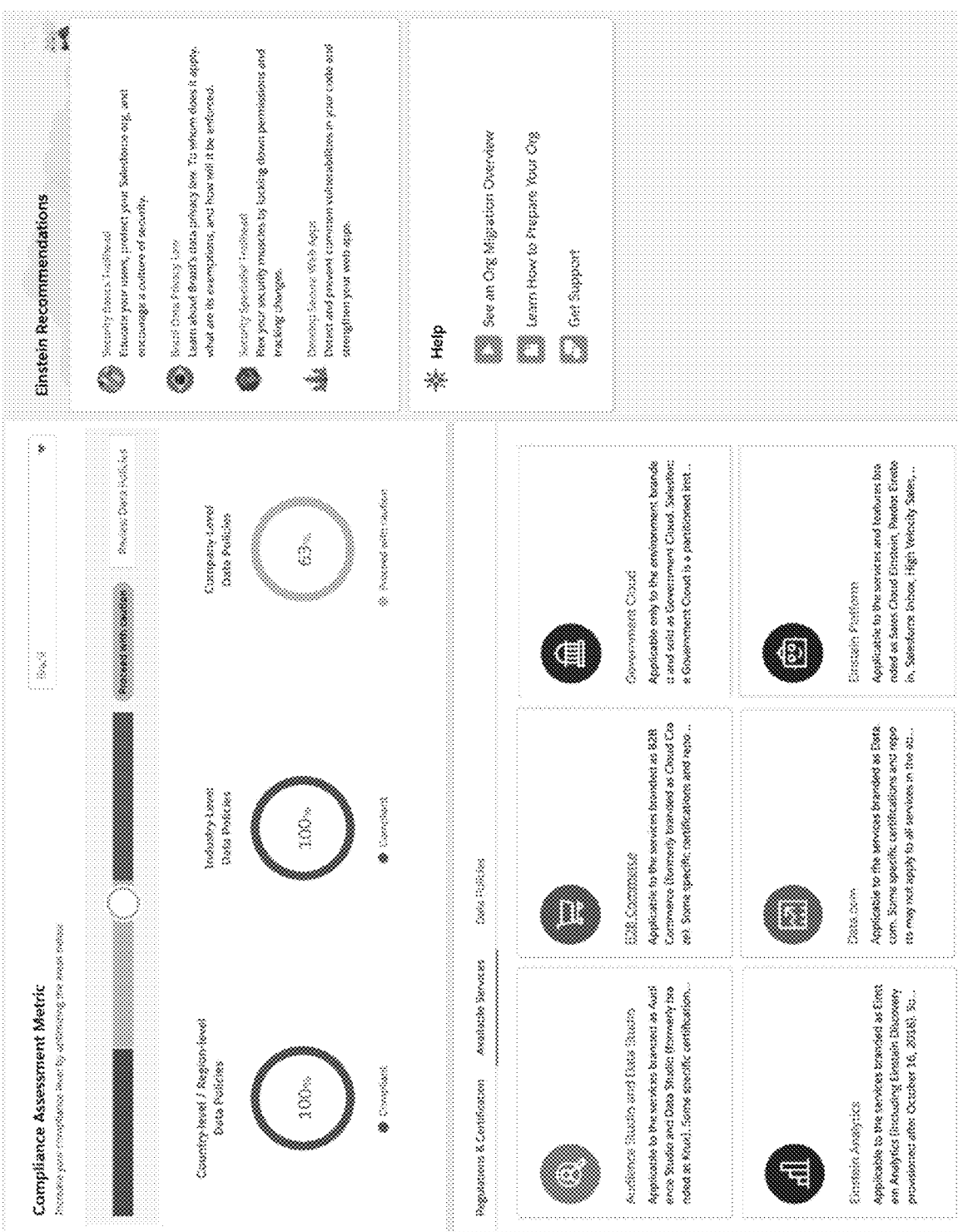
FIG. 1D is the bottom part of the updated dashboard of a data policy compliance service of a cloud-based software provider according to some implementations.

FIG. 1D is the bottom part of the updated dashboard of a data policy compliance service of a cloud-based software provider according to some implementations. FIG. 1D is similar to FIG. 1B, so the differences will be discussed. Namely, the second tile titled "Compliance Assessment Metric" has been updated to reflect the same type of information, but for the target geographic region rather than the current geographic region. In the specific examples of FIG. 1D, the metrics for the first two policy types indicate 100% compliance, while the metric for the third indicates 63% compliance and "Proceed with Caution" (while the image illustrates "Proceed with Caution" because some implementations use the same three tiers described above, some implementations display either "compliant" or "non-compliant" (i.e., a binary outcome) for the first type of compliance assessment metrics). FIG. 1B also shows the second type of compliance assessment metric which reflects a manner of combing all three of the first type. This second type of compliance assessment metric has the circle in the "Proceed with Caution" tier. Thus, the dashboard includes a set of one or more compliance assessment metrics reflecting how compliant the organization instance would be with a set of one or more policy types based on the organization instance being hosted in the second geographic region.

Figure 1E:
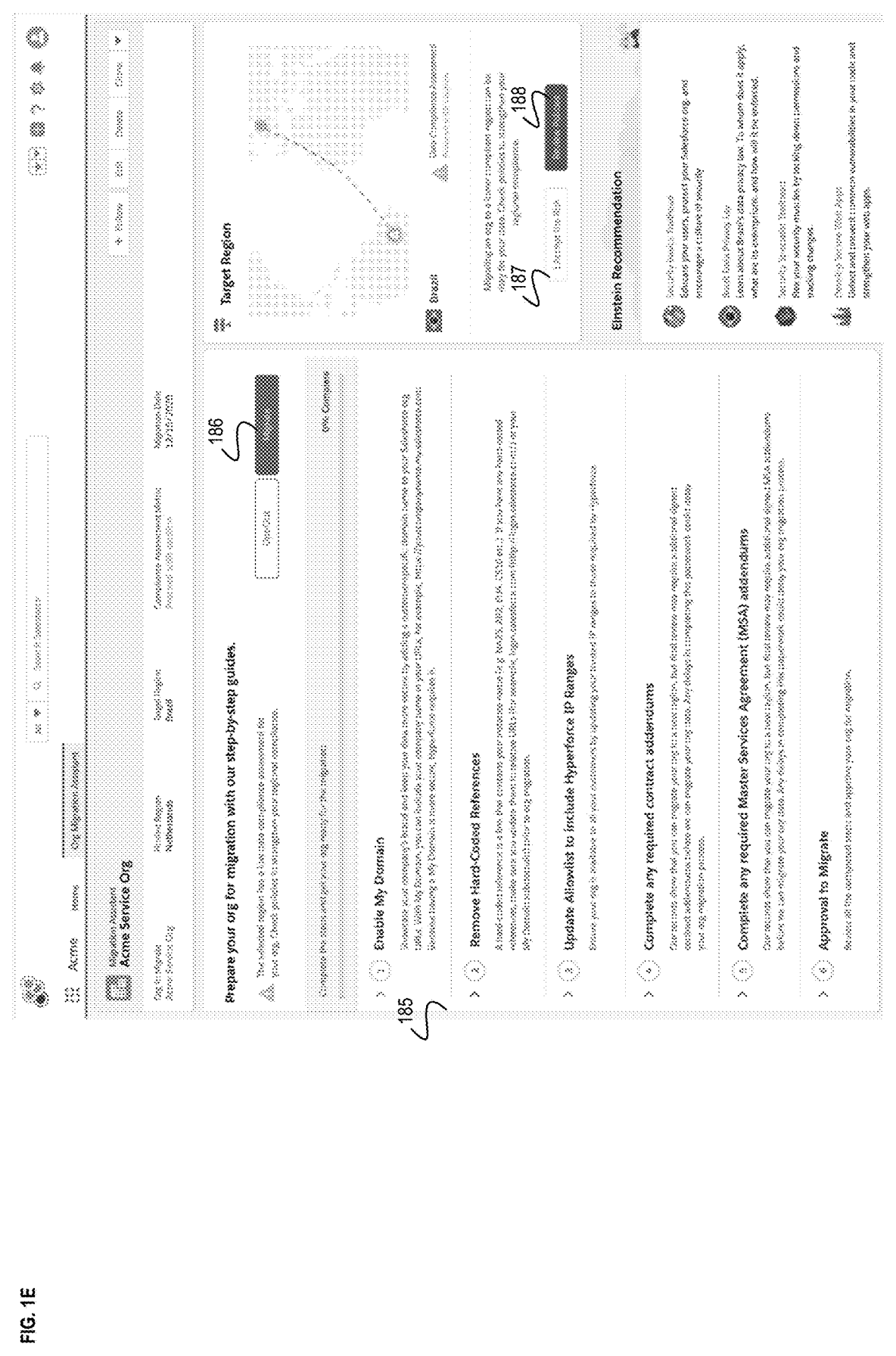
Figure 1F:
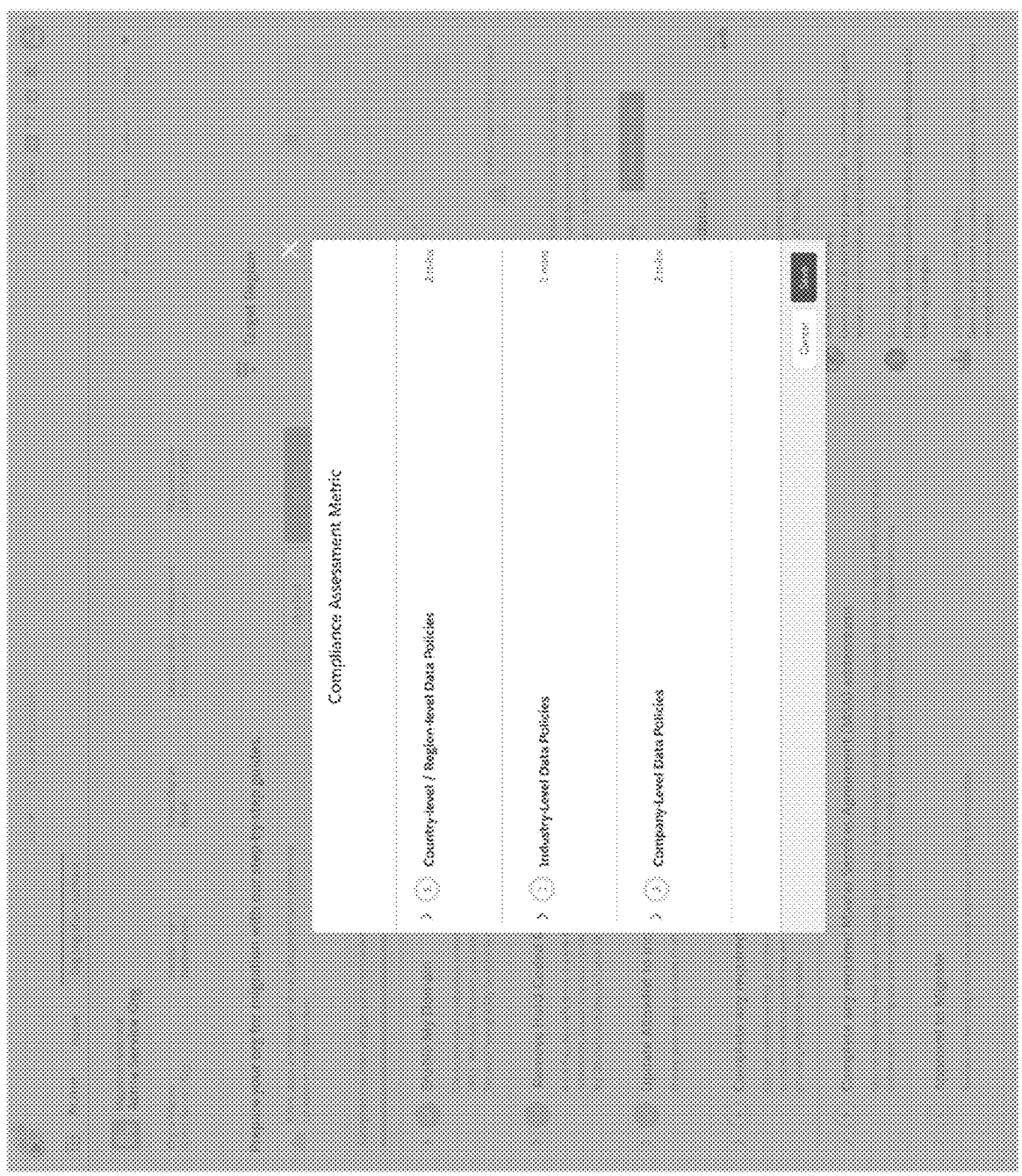
FIG. 1F is part of a dashboard of a data policy compliance service of a cloud-based software provider according to some implementations.

Responsive to user interaction (e.g., selection of the "Select this Region" button 184), the dashboard is updated to a set of acts to be performed before migrating the organization instance to the second geographic region as reflected in FIG. 1E-F.

FIG. 1E is part of a dashboard of a data policy compliance service of a cloud-based software provider according to some implementations. FIG. 1E shows a set of acts 185 to be performed before migrating the organization instance to the second geographic region. In some implementations, the dashboard also includes: 1) an interface element 186 (e.g., a "Migrate" button) whose selection causes the migration a the organization instance to the second geographic region; 2) an interface element 187 (e.g., the "I Accept the Risk" button) that allows the user to accept any risk reflected by a less than 100% compliance assessment metric(s); and/or 3) an interface element 188 (e.g., a "Review Policies" button) that allows the user to review the policies to try to improve the compliance assessment metrics. Responsive to user interaction (e.g., selection of the "Review Policies" button), the dashboard is updated to display information regarding one or more of the data policies as shown in FIG. 1F.

FIG. 1F is part of a dashboard of a data policy compliance service of a cloud-based software provider according to some implementations. FIG. 1F shows the provision of the ability to navigate through information regarding one or more of the data policies.

While FIGS. 1A-F illustrate implementations with both the first and second type of compliance assessment metrics, as well as three different policy types, other implementations may have more, less, and/or different types of compliance assessment metrics and/or policy types. While FIGS. 1A-F illustrate possible dashboards and interfaces, alternative implementations may rearrange and/or include more, less, or different information and interfaces.

Figure 2A:
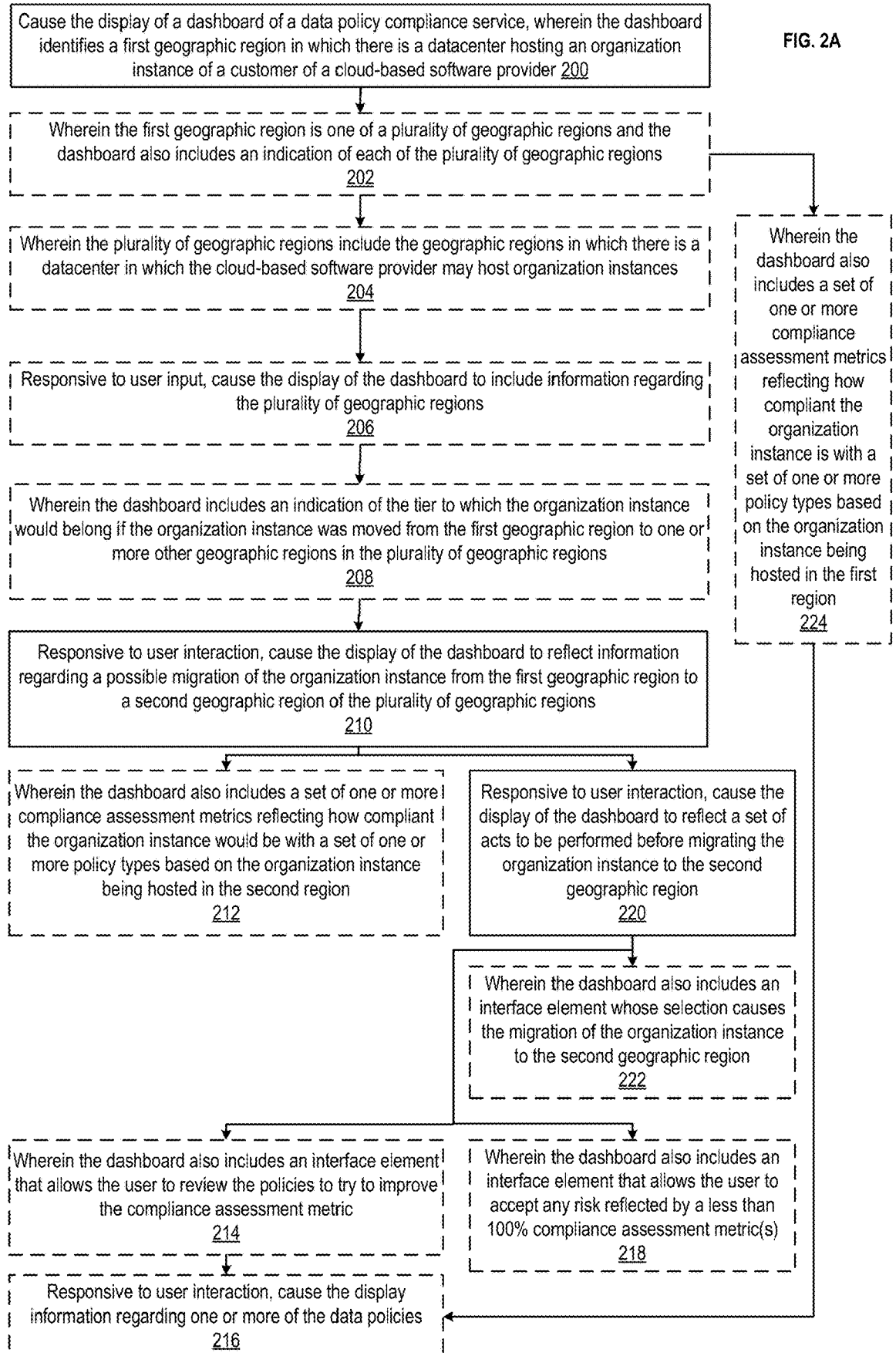
FIG. 2A is a flow diagram illustrating the updating of a dashboard of a data policy compliance service of a cloud-based software provider according to some implementations.

FIG. 2A is a flow diagram illustrating the updating of a dashboard of a data policy compliance service of a cloud-based software provider according to some implementations. Block 200 states "cause the display of a dashboard of a data policy compliance service, wherein the first dashboard identifies a first geographic region in which there is a datacenter hosting an organization instance of a customer of a cloud-based software provider." Control flows to block 202.

An example of this according to some implementations is shown and described with reference to FIG. 1A. As previously described, FIG. 1A shows a map with an icon in a geographic region where one or more organization instances are currently hosted.

Block 202, which is dashed and thus indicating it is optional, states "wherein the first geographic region is one of a plurality of geographic regions and the dashboard also includes an indication of each of the plurality of geographic regions." Control flows to block 204 and block 224.

An example of this according to some implementations is shown and described with reference to FIG. 1A. As previously described, the map in FIG. 1A also includes other icons in other geographics regions.

While FIG. 2A shows control flowing from block 202 to block 224, in alternative implementations control flows from block 200 to block 224. Regardless, one or both of these paths may be undertaken. The path along blocks 202-210 represents a user investigating a possible migration of an organization instance from one region to another. The path along block 224 to 216 represents a user investigating ways to improve the compliance assessment metric(s) for the organization instance in the current region in which it is hosted.

Block 204, which is dashed and thus indicating it is optional, states "wherein the plurality of geographic regions include the geographic regions in which there is a datacenter in which the cloud-based software provider may host organization instances." Control flows to block 206.

An example of this according to some implementations is shown and described with reference to FIG. 1A. As previously described, FIG. 1A shows a map with other icons in other geographic regions.

Block 206, which is dashed and thus indicating it is optional, states "responsive to user input, cause the display of the dashboard to include information regarding the plurality of geographic regions." Control flows to block 208.

An example of this according to some implementations is shown and described with reference to FIGS. 1A and 1C. As previously described, a user may interact with the dashboard by, for example, selecting the "Explore Regions" tab as show in FIG. 1C.

Block 208, which is dashed and thus indicating it is optional, states "wherein the dashboard includes an indication of the tier to which the organization instance would belong if the organization instance was moved from the first geographic region to one or more other geographic regions in the plurality of geographic regions." Control flows to block 210.

An example of this according to some implementations is shown and described with reference to FIG. 1C. As previously described, a user may interact with the dashboard by, for example, selecting an organization instance in a current region. In some implementations, the dashboard is updated to replace the above-described icons with icons that reflect an indication of the tier to which the organization instance would belong if the organization instance was moved from the current geographic region to one or more other geographic regions.

Block 210 states "responsive to user interaction, cause the display of the dashboard to reflect information regarding a possible migration of the organization instance from the first geographic region to a second geographic region of the plurality of geographic regions wherein the plurality of geographic regions include the geographic regions in which there is a datacenter in which the cloud-based software provider may host organization instances." Control flows to block 212 and 220.

An example of this according to some implementations is shown and described with reference to FIG. 1C. As previously described, a user may interact with the dashboard by, for example, selecting an icon representing one of the other regions (selecting a target region) to consider whether to migrate the selected organization instance from the current region to the target region. In some implementations, the dashboard is updated as described above to reflect the possible migration (see dashed line) and a popup with information about the target region. As also previously described, a user may interact with a "Select This Region" button, in which case the dashboard may be updated a show in FIG. 1E.

Block 212, which is dashed and thus indicating it is optional, states "wherein the dashboard also includes a set of one or more compliance assessment metrics reflecting how compliant the organization instance would be with a set of one or more policy types based on the organization instance being hosted in the second region."

An example of this according to some implementations is shown and described with reference to FIG. 1D. The displayed compliance assessment metric(s) may be used by a user to determine whether to click the "Select This Region" button.

Block 220 states "responsive to user interaction, cause the display of the dashboard to reflect a set of acts to be performed before migrating the organization instance to the second geographic region." Control flows to blocks 214, 222, and 218.

An example of this according to some implementations is shown and described with reference to FIG. 1E.

Block 214, which is dashed and thus indicating it is optional, states "wherein the dashboard also includes an interface element that allows the user to review the policies to try to improve the compliance assessment metric." Control flows to block 216.

An example of this according to some implementations is shown and described with reference to FIG. 1E. A user may interact with a "Review Policies" button, in which case the dashboard may be updated a shown in FIG. 1F.

Block 216, which is dashed and thus indicating it is optional, states "responsive to user interaction, cause the display information regarding one or more of the data policies."

An example of this according to some implementations is shown and described with reference to FIG. 1F.

Block 218, which is dashed and thus indicating it is optional, states "wherein the dashboard also includes an interface element that allows the user to accept any risk reflected by a less than 100% compliance assessment metric (s)."

An example of this according to some implementations is shown and described with reference to FIG. 1E. A user may interact with a "I Accept the Risk" button. As described below, some implementations will allow selection of this button if the combined compliance assessment score falls in a specific tier or tiers. For instance, the "Proceed with Caution" tier.

Block 222, which is dashed and thus indicating it is optional, states "wherein the dashboard also includes an interface element whose selection causes the migration of the organization instance to the second geographic region."

An example of this according to some implementations is shown and described with reference to FIG. 1E. A user may interact with a "Migrate" button. As described below, some implementations will allow selection of this button if: 1) the combined compliance assessment score falls in a first tier (e.g., the "Compliant" tier); or 2) the combined compliance assessment score falls in a second tier (e.g., the "Proceed with Caution" tier) and the user has already indicated that they accept the risk (e.g., by selecting the "I Accept the Risk" button).

Block 224, which is dashed and thus indicating it is optional, states "wherein the dashboard also includes a set of one or more compliance assessment metrics reflecting how compliant the organization instance is with a set of one or more policy types based on the organization instance being hosted in the first region." Control flows to block 216.

An example of this according to some implementations is shown and described with reference to FIG. 1B. As previously described, the displayed compliance assessment metric(s) may be used by a user to understand the status of compliance relative to all or a selected one of their organization instance(s).

While FIG. 2A is described using FIGS. 1A-F as examples, alternative implementations may: 1) have more, less, and/or different types of compliance assessment metrics and/or policy types; and 2) rearrange and/or include more, less, or different information and interfaces. Additionally or alternatively, an implementation may require more or less selections by the user, different types of selections (tabs, buttons, links, drop downs, swipes, etc.), and/or different ways of navigating to get to the example information on the example dashboards shown.

FIG. 1G is a block diagram illustrating components according to some implementations. More specifically, FIG. 1G shows a geographic region 102A including one or more organization instances 122, on top of one or more cloud-based software provider instances 112A.A, on top of one or more datacenters 113A.A-113A.R. One such organization instance 122 is organization instance 122A. FIG. 1G also shows the relationship of customers to a cloud-based software provider 132 (as well as possible relationships of customers of those customers). In addition, the set of one or more geographic regions 103A illustrate that different ones of these customers may be in the same or different ones of the plurality of geographic regions. FIG. 1G shows that the components shown in the geographic region 102A may be viewed as belonging to one of two layers: a datacenter hardware layer 110 and a datacenter customer layer 120. These layers can refer to the "hardware layer" of public cloud services and the "customer data layer" as described above.

More specifically, FIG. 1G shows that the cloud-based software provider 132 has customers 130, including potentially a customer 130A and a customer 130C. The customer 130C does not have any customers of itself, while the customer 130C is shown as having customers 160A-K. The cloud-based software provider 132 is shown as providing the cloud-based software providers instance(s) 112A.A with which its customers 130 may create organization instances 122.

The cloud-based software providers instance(s) 112A.A may provide a data policy compliance service 134 that utilizes policies 128, which may include region policies 128A and optionally industry policies 128B and company policies 128C, as described above. The cloud-based software providers instance(s) 112A.A may store the region policies 128A and optionally the industry policies 128B. In some implementations, the region policies 128A include not only the policies for the geographic region 102A, but also of other geographic regions with datacenters to which a customer may wish to migrate an organization instance and/or create a new organization instance. In some implementation, the industry policies 128B include policies for many different industries.

The organization instance 122A may include customer data including personal data 126A, rules to manage personal data 124A, and the company policies 128C. In some implementations, the personal data 126A includes or is similar to what was previously described as "personal data." The rules to manage personal data 124 includes or is similar to the previously described "the rules the customer has enabled to govern personal data" or the below described "rule set." These rules are configurable by a customer (e.g., using data privacy and/or data governance tools) for the organization instance as is known in the art, such as use of one or more data sensitivity levels (e.g., public, internal, confidential, restricted, mission critical, personal data, user identifiable data, user traceable data, etc.), compliance categorizations (e.g., Health Insurance Portability and Accountability Act (HIPAA), California Consumer Privacy Act (CCPA), General Data Protection Regulation (GDPR), Personal Identifiable Information (PII), Payment Card Industry (PCI) Data Security Standard, Children's Online Privacy Protection Act (COPPA), etc.), and customer consent forms and/or data (consent meaning information related to data privacy and/or data security requirements, regulations, and/or laws).

The data policy compliance service 134 may operate on the policies 128 relative to the organization instance 122A to cause the provision of the dashboards shown in FIGS. 1A-F according to the flow of FIG. 2A, and/or the alternative implementations described with reference to those figures. For instance, in some implementations the data policy compliance service 134 provides a dashboard that is or similar to that shown in FIG. 1A. The data policy compliance service 134 includes a compliance assessment metric(s) calculator 150, a migration explorer 152, an optional compliance assistor 154, and an optional migrator 156. As should be evident to the reader, the names of these components are descriptive of the actions those components would perform with regard to the provision of the data policy compliance service previously described. For example, the compliance assessment metric(s) calculator may operate to determine compliance assessment metric(s) in the manner described below so they may be presented in a dashboard as shown in FIGS. 1B, 1C and 1D, or a similar manner thereto. The migration explorer 152 may operate to allow the user to explore compliance assessment metric(s) in current and/or target regions in the manner described above so they may be presented in a dashboard like those depicted in FIGS. 1C and 1D, or a similar manner thereto. The compliance assistor 154 may operate to allow the user to investigate ways to improve compliance assessment metric(s) in the manner described and presented in FIG. 1F, or a similar manner thereto. The optional migrator 156 may operate to allow the user to understand and assist with the acts required to migrate from a current region to a target region in the manner described above and depicted in FIG. 1E, or a similar manner thereto. This may include any gating of the ability to migrate and/or requirement for acceptance of the risk as described above and below.

The other organization instance(s) 122 may have similar types of information as organization instance 122A. To provide an example, the organization instance 122A may have been created by the customer 130C, and be storing data pertaining to one or more of the customers 160A-K. The organization instance 122M may have been created by the customer 130A.

As should be evident to the reader, FIG. 1G illustrates that various arrangements of customer to organization instance are possible, as well as scenarios pertaining to the geographic region(s) in which different ones of the customers 130 and/or the customers 160 are located. For instance, while the organization instance 122A of the customer 130C is located in the geographic region 102A, the customers 160A-K may all be in the geographic region 102A but the customer 130C may be in a different geographic region. As another example, while the organization instance 122A of the customer 130C is located in the geographic region 102A, the customer 130C may be in the geographic region 102A but the customers 160A-K may all be in a different geographic region. As yet another example, while the organization instance 122A of the customer 130C is located in the geographic region 102A, the customer 130C and some of the customers 160A-K may be in the geographic region 102A, but others of the customers 160A-K may be in a different geographic region. As yet another example, while the organization instance 122A of the customer 130C is located in the geographic region 102A, the customer 130C and the customers 160A-K may be in one or more other geographic regions. As a final example, the organization instance 122A of the customer 130C, the customer 130C, and the customers 160A-K may all be the geographic region 102A.

Figure 1H:
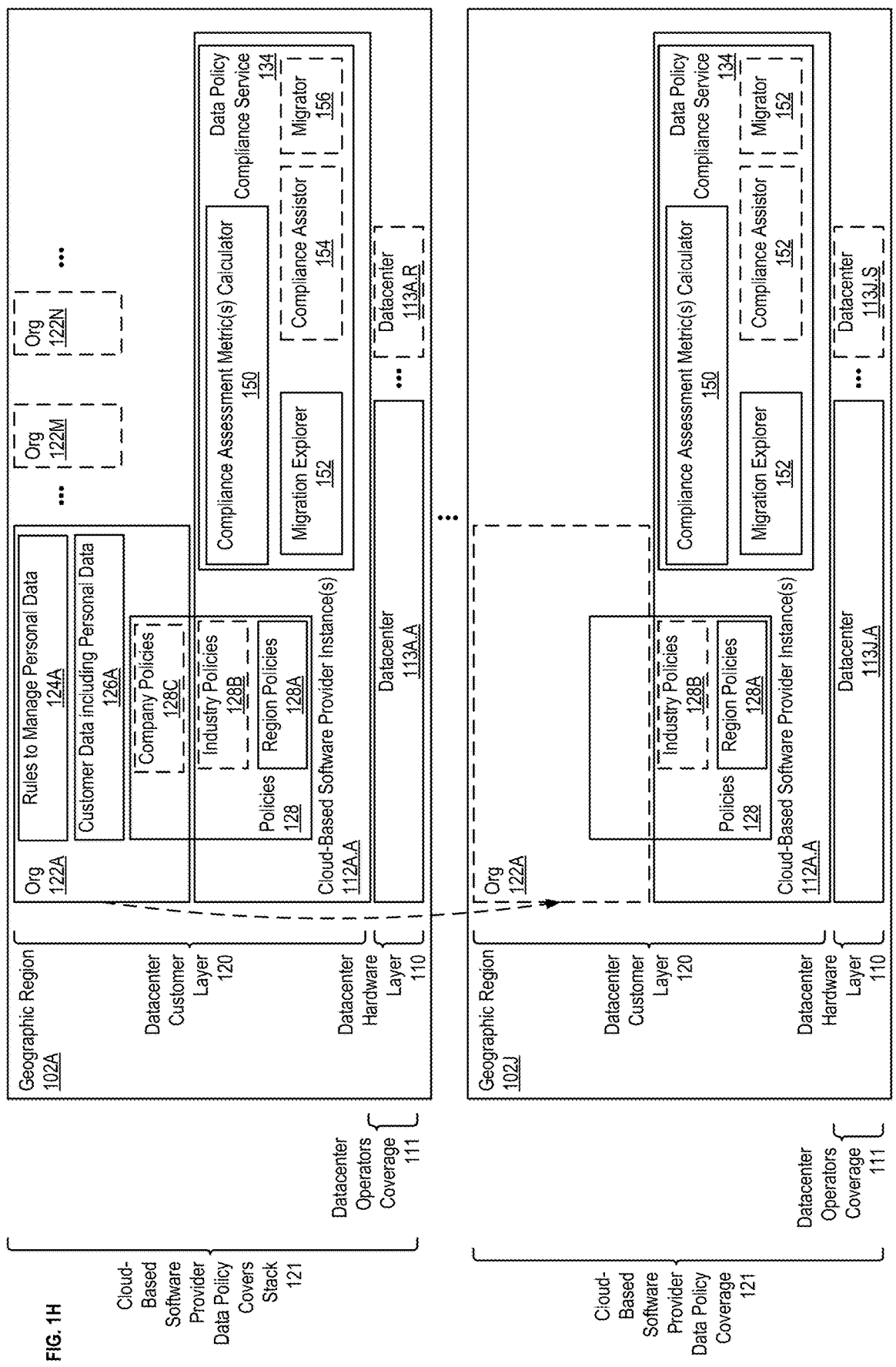
FIG. 1H is a block diagram illustrating components according to some implementations.

FIG. 1H is a block diagram illustrating components according to some implementations. FIG. 1H shows the same geographic region 102A, but also a second geographic region 120J with similar components and a dashed line reflecting the possibility of the organization instance 122A migrating to geographic region 102J. FIG. 1H has datacenter 113J.A-J.S in place of datacenter 113A.A-A.R in Figure G. As shown in FIG. 1H, in some implementations the cloud-based software provider instance(s) 112A.A are different instances of the same or similar software. Also, figure H shows that one or more of these instances may be on the same datacenter, different ones of these instances may be on different datacenters, and/or different ones of these instances may be on different datacenters in different geographic regions.

FIG. 1H illustrates that at least some implementations are capable of providing the data policy compliance service to provide a compliance assessment metric(s) from the customer data layer all the way through the hardware layer. More specifically, FIG. 1H shows that the datacenter operators' coverage 111 includes the operation of the datacenter hardware layer 110. In contrast, FIG. 1H shows that the cloud-based software provider's data policy coverage 121 may include both the datacenter customer layer 120 and the datacenter hardware layer 110. The cloud-based software provider can provide the data policy compliance service 134 to customers so they can use the service to understand and configure their data security and/or data privacy in a manner that address the stack the includes both the datacenter customer layer 120 and the datacenter hardware layer 110. As such, in some implementations, the cloud-based software provider through the data policy compliance service 134 can ensure and/or enable its customer to ensure that the datacenter customer layer 120 and the datacenter hardware layer 110 are properly configured, including configuring the datacenter hardware layer 110 such that it complies. This is true whether the a given datacenter is a first party datacenter of the cloud-based software provider, or if the datacenter is a third-party datacenter (the public cloud).

Determination and Application of the Compliance Assessment Metric(s) According to Some Implementations As described above, some implementations provide the combined compliance assessment metric in a 3-state (aka tier) format, using red, yellow, or green. In some implementations the colors are based on a binary assessment of whether the org is or is not in compliance with the applicable country-, industry-, and company-level compliance policies.

If an org is not in compliance with any of the set of compliance policies, some implementations will provide recommendations on how to resolve the issue. In addition, some implementations will provide the customer the option to dismiss the issue, if resolving the issue is not required (at company discretion).

Table 1 below shows the color result (that is, the tier) chosen for a number of scenarios, based on whether some implementations assess the org (aka organization instance) is (i.e., "yes") or is not (i.e., "no") in compliance with applicable types of policies.

| Scenario | Country | Industry | Company | | Assessment Color |
|---|---|---|---|---|---|
| 1 | Yes | Yes | Yes | = | Green |
| 2 | Yes | Yes | No | = | Yellow |
| 3 | Yes | No | No | = | Red |
| 4 | Yes | No | Yes | = | Red |
| 5 | No | No | No | = | Red |
| 6 | No | No | Yes | = | Red |
| 7 | No | Yes | Yes | = | Red |
| 8 | No | Yes | No | = | Red |

Creating the Compliance Assesment Metric according to Some Implementations

The binary decision for compliance with the country, industry, or company level policies is based on whether the org has applied (shown through automated inspection of the org) or resolved (shown by manual confirmation by user) all the applicable compliance line items associated with a given compliance area. In some implementations, each org has such a rule set (see above-described rules to manage personal data 124 and "the rules the customer has enabled to govern personal data") and there is an engine capable to one or both of automatically compare the rule set against the policies or provide a user the opportunity to manually input an indication of compliance. To accomplish the assessment (in an automated way), implementations determine whether the org has enabled certain data privacy/governance capabilities (the above-described rule set) and attempt to align them with the policies.

Note: any regulations which require end user consent for data use will be evaluated on two levels. First, some implementations will attempt to automate inspection of applicable products for the presence of these policies. Second, a manual confirmation will be used by some implementations to address any products/use cases not covered by automated processing.

Country-Level/Region-Level Data Policies

Country-level/Region-level data policies are those which derive from the regulatory authorities of a given geography. These policies are distinctive due to their applicability to companies independent of their industry. CCPA is an example of a data policy at this level. For a given country hosting location, some implementations will surface the applicable compliance policies which should apply to the org.

Where applicable, some implementations will automatically evaluate the customer org based on its compliance with the specific regulations.

In all other cases, some implementations will request confirmation that the org is in compliance with specific regulations.

Result: If all line items are checked as complete, then green. Else red.

Industry-Level Data Policies

Industry-level data policies are those which derive from a specific industry regulatory authority within a specific geography. These policies are distinct due to their applicability exclusively to those companies which operate in a specific industry, like health care, financial services, or insurance. HIPAA is an example of such a data policy. For a given industry (within a given country hosting location), some implementations will surface the applicable compliance policies which should apply to the org.

Where applicable, some implementations will automatically evaluate the customer org based on its compliance with the specific regulations.

In all other cases, some implementations will request confirmation that the org is in compliance with specific regulations.

Result: If all line items are checked as complete, then green. Else red.

Company-Level Data Policies

Company-level data policies are those which are implemented in a given org based on the specific data policies a company intends to follow. Given the self-imposed nature of these policies, violations of these policies are treated in a manner distinct from those created by region-, country-, or industry-level regulators. After implementation of specific company-level data policies in a given org, some implementations will surface the applicable compliance policies which should apply to the customer org.

Where applicable, some implementations will automatically evaluate the customer org based on its compliance with the specific policies.

In all other cases, some implementations will request confirmation that the org is in compliance with specific policies.

Result: If all line items are checked as complete, then green. Else red.

Compliance Assessment Metric Gating Org Migration According to Some Implementations There are many reasons a company may migrate its org data from one hosting location to another. To aid this migration process of moving data from a source region to a target region, some implementations require all applicable country- and industry-level compliance line items to be resolved in the target region before initiating the migration process. On the explore page, potential regions will be evaluated using the compliance assessment metric for suitability for an org migration.

If the region has a compliance assessment metric of yellow or green, the customer can elect to migrate their org data.

If the region has a compliance assessment metric of red, the customer must resolve specific country- or industry-level compliance line items before an org migration is available to that region.

Result: the customer completes all the required compliance paperwork before initiating the org migration process, thereby streamlining the overall process Exemplary Flow to Generate Compliance Assessment Metrics According to Some Implementations FIG. 2B is a flow diagram for generating compliance assessment metrics according to some implementations. The flow of FIG. 2B can be triggered by one or more types of triggers, including the generation of a dashboard, a need to update a compliance assessment metric, periodically, etc. Block 250 states "determine a set of one or more compliance assessment metrics." Control flows to block 280.

Since implementations may implement block 250 differently, the blocks inside are dashed. For instance, in an implementation that generates a single compliance assessment metric, the blocks inside block 260 may not be performed. At a first level, block 260 states "Determine a subset of one or more compliance assessment metrics based on policies of a set of one or more types" and block 270 states "combine the compliance assessment metrics in the subset of compliance assessment metrics to form a combined compliance assessment metric."

Blocks 260 and 270 may be performed differently by different implementations. In some implementations that do so in the or a similar manner as the technique described above, the following is performed: 1) block 260 includes blocks 262, 264, and 266 which respectively state determine a first, second, and third compliance assessment metric based on policies of a first, second, and third types; and 2) block 270 includes blocks 272, 274, and 276 which respectively set the combined compliance assessment metric respectively to a first, second, and third tier based the states of the first, second, and third compliance assessment metrics. In the context of the prior description: 1) the first, second, and third compliance metrics may be respectively based on the region, industry, and company policy types; 2) the first and second states may respectively be compliant or not compliant; and 3) the first, second, and third tiers may respectively indicate ready to go, proceed with caution, and not compliant based on the logic in Table 1.

Block 280 states "cause the display of at least one of the set of compliance assessment metrics in a dashboard." FIGS. 1B and 1D are examples of tiles of dashboards including indications of all four of the compliance assessment metrics. FIG. 1C is an example of a tile of a dashboard including indications of only the combined compliance assessment metric for each of a number of regions. Control flows to optional block 290.

Block 290 states "gate the ability to migrate an organization instance based on at least one the set of compliance assessment metrics." Block 290 may be performed differently by different implementations. In some implementations that do so in the same or a similar manner as the technique described above, the following is performed: 1) block 292 states "when the combined compliance assessment metric is set to a first tier, cause the migration responsive to the user indicating to migrate;" 2) block 294 states "when the combined compliance assessment metric is set to a second tier, cause the migration responsive to the user indicating to migrate only if the user has affirmed acceptance of the risk of the migration;" and 3) block 296 states "when the combined compliance assessment metric is set to a third tier, do not allow the migration." In the context of the prior description: 1) the first, second, and third tiers may respectively indicate ready to go, proceed with caution, and not compliant; and 2) the gating is based on the logic described above.

Updating Compliance Assessment Metric(s)

As described above, one or more of the compliance assessment metrics may change based on changes to any of the policies and/or changes to the rules the customer has enabled to govern personal data. For instance, a customer may use a cloud-based provider instance to edit the rules to manage personal data and/or the company policies in their organization instance, and thus necessitate a change in the compliance assessment metric(s). Additionally or alternatively, a customer may start collecting different personal data in their organization instance, and thus necessitate a change in the compliance assessment metric(s). Additionally or alternatively, the cloud-based software provider may edit, or optionally enable customers to propose edits, to the industry policies and/or the region policies, and thus necessitate a change in the compliance assessment metric(s).

Dashboards According to Some Implementations

A dashboard is typically a collection of boxes (often rectangular and referred to as tiles or panels) that often fits on a single webpage or application window (also called a canvas) and that is for display to a user through a user device. Typically, a given dashboard is for display to many users through multiple user devices. Each box of a dashboard contains a content element (e.g., a chart, a graph, an image, a spreadsheet, a pivot table, a list, a table, a widget; some of which are sometimes referred to as a "view" or a "visual") which represents or is based on data from a data set. A dashboard and/or one, more, or all of the boxes may include a "menu bar" or other type of display item that allows the user to interact with the dashboard and/or the boxes. A data set is a collection of data used to create a content element. A data set may include (filtered and/or unfiltered) data from a single data source or from multiple data sources (e.g., one or more tables from an Excel workbook, one or more databases, a website, software services (e.g., Salesforce), etc.).

While in some implementations the user interface providing the dashboard is such that the available dashboards are relatively fixed, in other implementations the user interface allows users to create and edit dashboards, and share them with other users. Existing user interfaces (sometimes referred to as business intelligence (BI) tools) allow for this. The ability to create and/or edit dashboards is sometimes referred to as self-service or user-customizable dashboards. This ability enables data discovery. Data discovery is a user-driven process of collating, visualizing, exploring, and analyzing a data set, including searching for patterns or specific items in a data set. Data discovery applications often use visual tools (e.g., maps, pivot-tables) to make the process of finding patterns or specific items rapid and intuitive. Data discovery may leverage statistical and data mining techniques to accomplish these goals.

Data Privacy (e.g., GDPR)

Computing environments may manage data related to multiple entities (e.g., people, groups, companies, positions, archives) and need to provide privacy and data governance functionality. Such computing environments may store for each entity multiple database objects and/or records, each of which can have associated privacy and data governance characteristics and parameters. For example, in a small office setting, an employee may have: 1) an employee profile managed by the human resources department; and 2) an individual contact entry in a shared contacts database/app/tool. Each of these objects and/or records may have different associated permissions, uses, privacy requirements, access rights, etc.

Data classifications (referred to above as data sensitivity levels) may be associated with fields of database objects and used to determine data permissions, data uses, privacy requirements, access rights, data governance, etc. For example, data classifications may include one or more of: 1) Public (e.g., data meant to be viewed, but not altered, by the public); 2) Internal (e.g., data meant to be viewed/used by all at an organization that owns the data and/or contractors thereof, and potentially shared with customers, partners, and others under a non-disclosure agreement (NDA)); 3) Confidential (e.g., data meant to be used by a defined subset of the organization that owns the data and/or contractors thereof, and potentially shared with customers, partners, and others under a non-disclosure agreement (NDA) on an as-needed basis, but is not protected by law or regulation); 4) Restricted (e.g., data meant to be used by a smaller, defined subset of the organization and/or its contractors and is likely protected by law, regulation, and/or NDA); and/or 5) Mission Critical (e.g., data meant to be used by an even smaller, defined subset of employees/owners, as well as previously approved contractors or third parties subject to heightened contractual requirements, and is almost always protected by law, regulation, and/or NDA).

Example Electronic Devices and Environments

Electronic Device and Machine-Readable Media

A "reference" refers to data useable to locate other data and may be implemented a variety of ways (e.g., a pointer, an index, a handle, a key, an identifier, etc.).

Receipt of data by the system may occur differently in different implementations (e.g., it may be pushed to the system (often referred to as a push model), pulled by the system (often referred to as a pull model), etc.).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
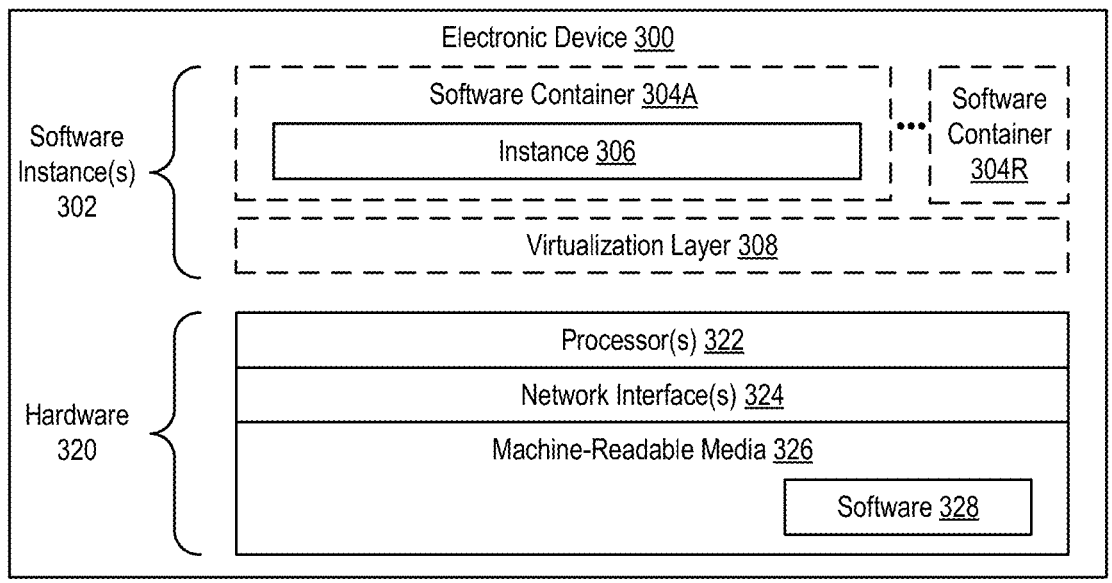
FIG. 3A is a block diagram illustrating an electronic device 300 according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and the data policy compliance service may be implemented in one or more electronic devices 300. In one implementation: 1) each of the clients is implemented in a separate one of the electronic devices 300 (e.g., in end user devices where the software 328 represents the software to implement clients to interface directly and/or indirectly with the data policy compliance service (e.g., software 328 represents a web browser, a native client, a portal, a command-line interface, and/or an application programming interface (API) based upon protocols such as Simple Object Access Protocol (SOAP), Representational State Transfer (REST), etc.)); 2) the data policy compliance service is implemented in a separate set of one or more of the electronic devices 300 (e.g., a set of one or more server devices where the software 328 represents the software to implement the data policy compliance service); and 3) in operation, the electronic devices implementing the clients and the data policy compliance service would be communicatively coupled (e.g., by a network) and would establish between them (or through one or more other layers and/or or other services) connections for submitting requests to the data policy compliance service and returning results/data to the clients. Other configurations of electronic devices may be used in other implementations (e.g., an implementation in which the client and the data policy compliance service are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Example Environment

Figure 3B:
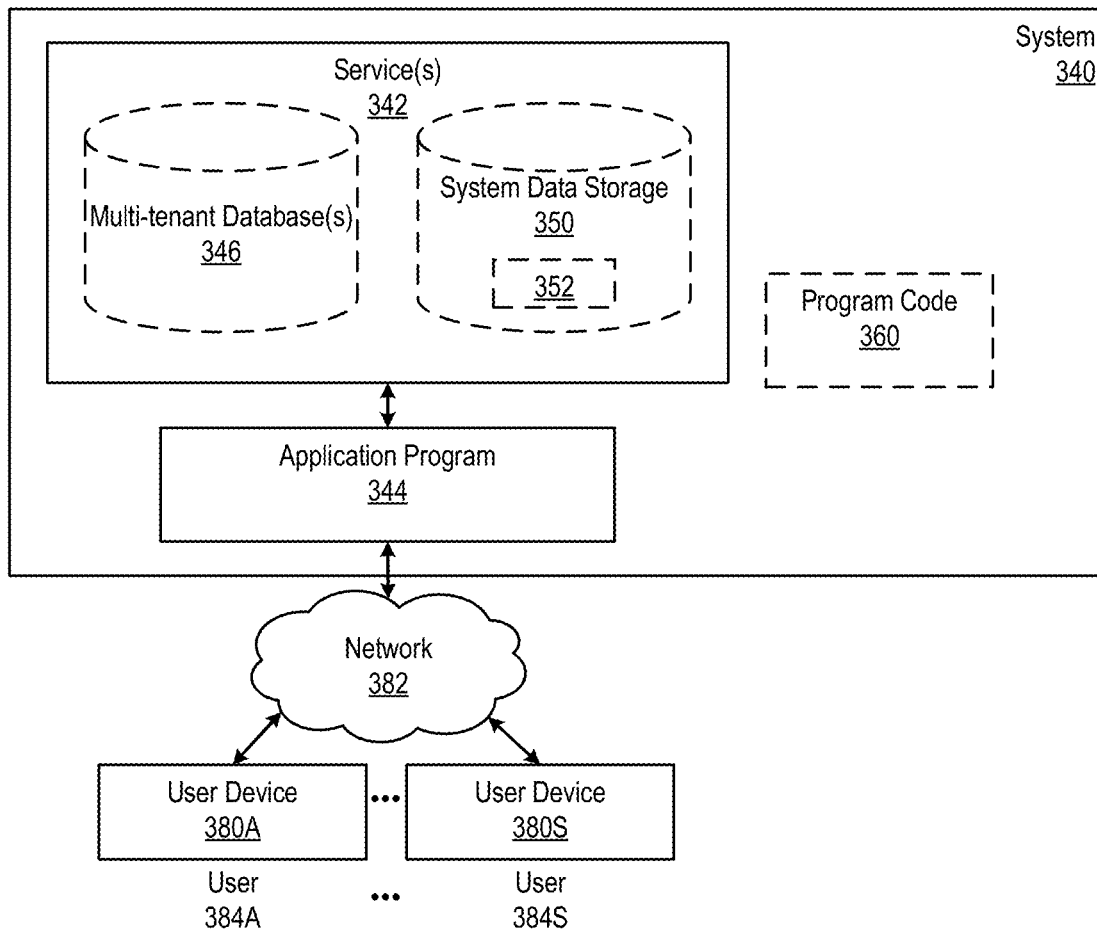
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including the data policy compliance service. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. This input information is one of the above-described organization instances. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: a data policy compliance service 342; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the data policy compliance service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An article of manufacture comprising:
a non-transitory machine-readable storage medium that provides instructions that, if executed by a set of one or more processors, are configurable to cause the set of processors to perform operations comprising,
causing the display of a dashboard of a data policy compliance service, wherein the dashboard identifies a first geographic region in which there is a first datacenter hosting an organization instance of a customer of a cloud-based software provider; and
responsive to user input, causing the display of the dashboard to reflect information regarding a possible migration of the organization instance from the first geographic region to a second geographic region in which there is a second datacenter capable of hosting the organization instance of the customer of the cloud-based software provider, wherein the information includes a set of one or more compliance assessment metrics reflecting a level of compliance of the organization instance with data privacy or data security laws, regulations, or policy.

2. The article of manufacture of claim 1, wherein the set of one or more compliance assessment metrics reflects the level of compliance of the organization instance with data privacy or data security laws, regulations, or policy of the second geographic region.

3. The article of manufacture of claim 1, wherein the set of one or more compliance assessment metrics reflects the level of compliance of the organization instance with data privacy or data security laws, regulations, or policy of an industry of the customer.

4. The article of manufacture of claim 1, wherein the set of one or more compliance assessment metrics reflects the level of compliance of the organization instance with a policy of the customer relative to data privacy or data security laws, regulations, or policy of different geographic regions or an industry of the customer.

5. The article of manufacture of claim 1, wherein the set of one or more compliance assessment metrics reflects the level of compliance of the organization instance with: 1) laws or regulations of different geographic regions in which datacenters are located; 2) laws, regulations, or policy pertaining to an industry of the customer; 3) a policy of the customer; or 4) any combination thereof.

6. The article of manufacture of claim 1, wherein the set of compliance assessment metrics includes a plurality of compliance assessment metrics of a first type that are each specific to a different type of policy, and wherein the set of compliance assessment metrics includes at least one compliance assessment metric of a second type that represents a combination of two or more of the first types.

7. The article of manufacture of claim 1, wherein the organization instance includes data, metadata, or configuration of the customer hosted within a service of the cloud-based software provider service.

8. The article of manufacture of claim 1, wherein migration of the organization instance will result in data of the customer being hosted or processed in the second datacenter in the second geographic region.

9. The article of manufacture of claim 1, wherein the data policy compliance service allows the customer of the cloud-based software provider to choose in which of a plurality of geographic regions data of the customer will be at least one of hosted and processed.

10. The article of manufacture of claim 1, wherein the operations further comprise:
responsive to user input, causing the display of the dashboard to include information regarding a plurality of geographic regions that includes the second geographic region.

11. The article of manufacture of claim 1, wherein the operations further comprise:
responsive to user interaction, causing the display of the dashboard to reflect a set of acts to be performed before migrating the organization instance to the second geographic region.

12. The article of manufacture of claim 1, wherein the services provided by the cloud-based software provider include one or more of Software-as-a-Service (SaaS), Data-as-a-Service (DAAS or DaaS), and Platform-as-a-service (PAAS or PaaS).

13. The article of manufacture of claim 1, wherein each of the first datacenter and the second datacenter may be a first party datacenter or a third-party datacenter.

14. The article of manufacture of claim 1, wherein the first datacenter is a third-party datacenter, and wherein the cloud-based software provider is a customer of an operator of the third-party datacenter.

15. An article of manufacture comprising:
a non-transitory machine-readable storage medium having stored thereon software, which when executed by a set of processors of a datacenter hardware layer of a datacenter, provides a cloud-based software provider instance to host an organization instance of a customer of a cloud-based software provider, wherein the cloud-based software provider instance and the organization instance are part of a datacenter customer layer, the cloud-based software provider instance comprising:
a set of one or more data privacy or data security policies that include geographic region policies representing data privacy or data security laws, regulations, or policy of different geographic regions; and
a data policy compliance service to operate on the set of one or more policies relative to the organization instance to provide dashboards to the customer of the cloud-based software provider, wherein the data policy compliance service includes,
a compliance assessment metric calculator to determine compliance assessment metrics to present in the dashboards that are based on the set of one or more policies, customer data including personal data in the organization instance, and rules to manage personal data in the organization instance; and
a migration explorer to allow a user to see the dashboards with the compliance assessment metrics for a plurality of geographic regions that include datacenters that may be used to host the organization instance.

16. The article of manufacture of claim 15, wherein the compliance assessment metrics reflect a level of compliance of the rules to manage personal data based on the set of one or more data privacy or data security policies.

17. The article of manufacture of claim 15, wherein the set of one or more policies also includes industry policies that represent data privacy or data security laws, regulations, or policy of different industries, and wherein the compliance assessment metrics reflect a level of compliance of the rules to manage personal data with one or more of the geographic region policies and one of the industry policies.

18. The article of manufacture of claim 17, wherein the compliance assessment metrics reflect a level of compliance of the rules to manage personal data with a company policy of the customer relative to data privacy or data security laws, regulations, or policy of one or more of the geographic region policies and one of the industry policies.

19. The article of manufacture of claim 15, wherein the different geographic regions are the geographic regions with datacenters to which the customer of the cloud-based software provider can migrate the organization instance or create a new organization instance.

20. The article of manufacture of claim 19, wherein the set of one or more policies also includes industry policies that represent laws, regulations, or policy of different industries, wherein the organization instance is to include a company policy of the customer, and the compliance assessment metrics reflect a level of compliance of the rules to manage personal data with the geographic region policy of at least one region, the industry policy of an industry of the customer, the company policy of the customer, or any combination thereof.

21. The article of manufacture of claim 15, wherein compliance assessment metrics includes:
   a plurality of compliance assessment metrics of a first type that are each specific to a different type of policy; and
   at least one compliance assessment metric of a second type that represents a combination of two or more of the first types.

22. The article of manufacture of claim 15, wherein the data policy compliance service is to also utilize a company policy in the organization instance.

23. The article of manufacture of claim 15, wherein the rules are configurable by the customer represent data sensitivity levels, compliance categorizations, customer consent forms, customer consent data, or any combination thereof.

24. The article of manufacture of claim 15, wherein the compliance assessment metrics span the customer data layer through the datacenter hardware layer to allow the customer to configure the rules in a manner that addresses both the datacenter customer layer and the datacenter hardware layer.

25. The article of manufacture of claim 15, wherein the cloud-based software provider instance also comprises:
   a compliance assistor to allow the user to investigate ways to improve the compliance assessment metrics determined for the organization instance of the customer.

26. The article of manufacture of claim 15, wherein the cloud-based software provider instance also comprises:
   a migrator to allow the user to understand and assist with acts required to migrate from a current one of the different geographic regions to a target one of the different geographic regions.

27. The article of manufacture of claim 26, wherein the migrator is to gate the ability to migrate or require the user accept the risk relative to data compliance of migration of the organization instance from the current one of the different geographic regions to the target one of the different geographic regions.

* * * * *